United States Patent
De Gradi (10) Patent No.: US 8,298,040 B2
(45) Date of Patent: Oct. 30, 2012

(54) PROCESS AND APPARATUS FOR GRINDING TYRES

(75) Inventor: Stefano De Gradi, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 447 days.

(21) Appl. No.: 12/733,043

(22) PCT Filed: Aug. 9, 2007

(86) PCT No.: PCT/IB2007/053161
§ 371 (c)(1),
(2), (4) Date: Feb. 4, 2010

(87) PCT Pub. No.: WO2009/019537
PCT Pub. Date: Feb. 12, 2009

(65) Prior Publication Data
US 2010/0144243 A1    Jun. 10, 2010

(51) Int. Cl.
*B24B 49/00* (2012.01)
*B24B 5/36* (2006.01)
(52) U.S. Cl. .............. 451/5; 451/51; 451/65; 451/283
(58) Field of Classification Search .............. 451/5, 8, 451/51, 62, 283, 920
See application file for complete search history.

(56) References Cited

U.S. PATENT DOCUMENTS

| | | | |
|---|---|---|---|
| 3,491,493 A | 1/1970 | Deist | |
| 3,724,137 A | 4/1973 | Hofelt, Jr. et al. | |
| 3,739,533 A | 6/1973 | Iida et al. | |
| 3,817,003 A | 6/1974 | Monajjem | |
| 4,047,338 A * | 9/1977 | Gormish et al. | 451/1 |
| 4,095,374 A * | 6/1978 | Ugo | 451/1 |
| 4,173,850 A | 11/1979 | Gormish et al. | |
| 4,837,980 A * | 6/1989 | Rogers, Jr. | 451/5 |
| 4,936,054 A * | 6/1990 | Rogers et al. | 451/51 |
| 4,984,393 A * | 1/1991 | Rogers, Jr. | 451/5 |
| 5,167,094 A * | 12/1992 | Wild et al. | 451/11 |

OTHER PUBLICATIONS

European Search Report for International Application No. PCT/IB2007/053161, mailing date Apr. 29, 2008.

* cited by examiner

*Primary Examiner* — Dung Van Nguyen
(74) *Attorney, Agent, or Firm* — Finnegan, Henderson, Farabow, Garrett & Dunner, L.L.P.

(57) ABSTRACT

A process and an apparatus for optimising tyres after vulcanization, in order to improve the dynamic behavior of the tyre itself. The process includes first of all the stages of measuring the curve of the radial force of the tyre, calculating the first harmonic of this radial force and identifying on the tyre a point corresponding to the maximum of the first harmonic. Subsequently, material is removed from the tread over an arc subtending a principal angle positioned either side of the maximum point of the first harmonic. The removal stage is performed by removing discrete circumferential portions of the arc with differentiated depths of removal, increasing from opposite ends of this arc toward the maximum point of the first harmonic.

22 Claims, 8 Drawing Sheets

PROCESS AND APPARATUS FOR GRINDING TYRES

CROSS REFERENCE TO RELATED APPLICATION

This application is a national phase application based on PCT/IB2007/053161, filed Aug. 9, 2007, the content of which is incorporated herein by reference.

BACKGROUND OF THE INVENTION

1. Field of the Invention

The present invention concerns a process and an apparatus for grinding tyres.

More particularly, the invention has as its subject a process for grinding tyres carried out to improve the dynamic behaviour of the tyre itself.

2. Description of the Related Art

A tyre for vehicle wheels generally includes a carcass structure including at least one carcass ply having respectively opposed boundary edges secured to respective annular anchoring structures, built into the areas usually identified with the name of "beads", having an inner diameter substantially corresponding to a so-called "seating diameter" of the tyre on a respective rim.

The carcass structure is associated with a belt structure including one or more layers of belt located in radial superimposition one with respect to another and with respect to the carcass ply, having textile or metal reinforcing cords with orientation crossed and/or substantially parallel to the direction of circumferential extension of the tyre. In a position radially external to the belt structure a tread band is applied, this too being in elastomeric material like other semifinished constituent parts of the tyre.

On the lateral surfaces of the carcass structure, each extending from one of the lateral edges of the tread band to the vicinity of the respective annular structures anchoring the bead, there are respective sidewalls in elastomeric material applied in an axially external position. On tyres of "tubeless" type, a layer of coating impermeable to air, usually called a "liner", covers the inner surfaces of the tyre.

The process of making up the raw tyre, which is performed by assembling the respective components, is generally followed by carrying out a moulding and vulcanisation treatment aimed at bringing about the structural stabilisation of the tyre by reticulation of the elastomeric components, and also a process of impressing on it a desired tread pattern and any distinctive graphic marks in the region of the sidewalls of the tyre.

After vulcanisation, the tyres are subjected to a visual check, to identify any external geometrical irregularities, particularly on the tread, and a dynamic check, carried out while the tyre is revolving, to identify any imbalances due to defects internal to the structure, situated for example in the vicinity of the shoulders and/or the sidewalls of the tyre.

Tyres which do not fall within predetermined parameters with regard to geometrical and/or dynamic defects, and which therefore ought to be scrapped, undergo further processing to improve both the above-mentioned aspects. These processes enable a proportion of the defects to be remedied and bring about a reduction in the percentage of total tyre production which has to be scrapped. Document U.S. Pat. No. 3,491,493 describes a method and an apparatus for improving the dynamic behaviour of a tyre by abrasive removal of a portion of the external surface of the tyre itself. The size and the position are determined of the maximum radial force exercised by the tyre in rotation under load. The tyre is mounted eccentrically, in such a way that the maximum eccentricity coincides with the point of maximum radial force, and the tyre is rotated against a grinding wheel which removes material from the tyre so as to compensate for the irregularities in the tyre and thus produce a tyre with more regular behaviour on the road.

Document U.S. Pat. No. 3,724,137 discloses the combination of a grinder and a control system including means of supporting a tyre while it revolves around its own axis. Grinding wheels are mounted close to the tyre and are movable with respect to the tyre itself to grind selected portions of the same tyre at rest in proportion to variations in force measured around the circumference of the tyre. The control system includes means of generating electrical signals representing the variations in force and including transducers engaging the tyre, a memory for storing the electrical signals and emitting an output signal in response to the information stored, a servo mechanism for moving the grinding wheels with respect to the tyre, from and towards a grinding position in response to the output signal just mentioned.

Document U.S. Pat. No. 3,739,533 describes a method of optimizing uniformity for a tyre which includes the stage of measuring the deviation in the lateral force and the variation in the radial force of a tyre set in rotation, of generating corrective signals on the basis of the forces measured, of generating from the corrective signals two composite signals and of grinding the edges of the tread of the tyre in response to the composite signals.

Document U.S. Pat. No. 3,817,003 discloses a programmable system for increasing the capability of grinding machines by incorporating programmed switching from grinding based on the actual variation in force to grinding based on a harmonic of the variation in force.

Document U.S. Pat. No. 4,173,850 discloses a method and an apparatus for reducing the variation in tangential force in a tyre. The tyre is mounted on a rim and made to rotate against a loading drum. Force transducers located on the axis of the drum measure the variation in tangential force while the wheel rotates. The measurement is stored in the memory of a calculator which processes the data and obtains the first harmonic of this force, the magnitude of this first harmonic and the angular distance from the maximum point of this magnitude. The grinding wheel engages the tyre from a point 90° before this maximum to a point 90° after the maximum. The shoulders of the tyre are not touched by the grinder unless grinding is being done to reduce the variation in lateral and radial forces.

SUMMARY OF THE INVENTION

The Applicant has decided to tackle the problem of reducing the percentage of tyres which must be scrapped because they have defects which are such as to compromise their performance and make it impossible to sell and use them.

The Applicant has also decided to tackle the problem of reducing the dynamic imbalance of tyres which are found to be defective at the end of the production process, i.e. after vulcanisation.

In particular, the Applicant has decided to tackle the problem of reducing the variation in radial force (RFV) due to fabrication defects, with greater effectiveness than the known solutions: this radial force variation increases the vibration and noise generated by the tyre in use on the road.

The term "radial force variation" (RFV) is intended to denote the maximum variation in radial force measured between the minimum value and the maximum value (peak-to-peak distance) of the curve of the above-mentioned radial force (RF).

The Applicant has also decided to tackle the problem of simplifying the known processes aimed at correcting defects in tyres and simplifying the apparatus dedicated to these processes.

The Applicant has also decided to tackle the problem of increasing the speed of the processes aimed at effecting these corrections, in order to increase the productivity of the entire manufacturing process.

In accordance with the present invention, the Applicant has found that by removing from the tread discrete circumferential portions of material, along an arc of circumference and with differentiated depths of removal increasing from the end of the arc towards a geometric point corresponding to the maximum of the first harmonic of the radial force (RF), a net improvement is obtained in the dynamic properties of the tyre.

More specifically, according to a first aspect the present invention concerns a process for grinding tyres, comprising the stages of: measuring the curve of the radial force of a tyre; calculating the first harmonic of said radial force; identifying on the tyre a point corresponding to the maximum of said first harmonic; removing material from the tread of the tyre over an arc subtending a principal angle positioned either side of the maximum point of the first harmonic; wherein the removal stage is performed by removing from the tread discrete circumferential portions of the arc with differentiated depths of removal increasing from opposite ends of said arc towards the maximum point of the first harmonic.

The applicant has found that the above-mentioned process allows the first harmonic of the radial force to be smoothed out and ensures the lowering of the variation in radial force (RFV), by which is meant the distance between the maximum point and the minimum point of the curve of the radial force, so as to attenuate the dynamic forces acting on the tyre in rotation and improve its behaviour on the road.

The Applicant has verified that by using the above process it is possible to bring the RFV value and the first harmonic value of substantially all defective tyres within an acceptable field of values.

At the same time, the Applicant has observed that this result is obtained by removing a minimal quantity of material, certainly smaller than the quantity removed by the processes of known type.

The Applicant has also observed that this process proves to be very simple and quick and does not require complicated measuring and correction devices which act by feedback.

According to a further aspect, the present invention concerns an apparatus for grinding tyres, comprising: devices for measuring the radial force of a tyre, calculating the first harmonic of said radial force and identifying on the tyre a point corresponding to the maximum of said first harmonic; a device for making the tyre rotate around its own axis of rotation; a removal device, for example a grinder, having working surfaces which can engage with a tread of said tyre; devices for moving the removal device with respect to the tyre; a device capable of controlling the movement of said removal device, so as to remove material from the tread of the tyre over an arc subtending a principal angle positioned either side of the maximum point of the first harmonic, by removing from the tread discrete circumferential portions of the arc with differentiated depths of removal increasing from opposite ends of said arc towards the maximum point of the first harmonic.

By the verb "rotating" used above is meant both a continuous rotation of the tyre around its own axis of rotation and in a pre-established direction, for one or more complete revolutions, and an alternating oscillating motion performed around its own axis of rotation.

The present invention, in at least one of the above aspects, can present one or more of the preferred characteristics which are described below.

Preferably, the principal angle is equal to 240° or less. The efficacy of machining according to the invention does not increase significantly for angles greater than 240°. On the other hand, machining over an angle of smaller dimensions allows a tyre to be effectively ground in a shorter time.

The principal angle can advantageously be equal to 180° or more.

By using an arc greater than 180° it is possible to act also on at least one of the peaks of the second harmonic, obtaining an even more effective lowering of the RFV.

Preferably, the material is removed from at least one of the shoulders of the tread and, even more preferably, from each of the shoulders of the tread.

The area of the shoulders is the most rigid and therefore removal of material from that area causes a negligible alteration to the structural rigidity of the tyre.

In a preferred embodiment, removal of discrete circumferential portions generates corresponding curved surfaces centred on the axis of rotation of the tyre. Furthermore, removal of discrete circumferential portions generates curved surfaces presenting a profile symmetrical with respect to a radius passing through the maximum point.

In accordance with one embodiment, material with a maximum radial thickness of 1.2 mm or less is removed in the area of a first discrete circumferential portion located in proximity to the maximum point.

Preferably, material with a maximum radial thickness of 0.4 mm or more is removed in the area of a first discrete circumferential portion located in proximity to the maximum point.

In accordance with one embodiment of the apparatus, the tyre is made to oscillate, starting from a maximum angle of oscillation, through angles of oscillation decreasing down to a minimum angle of oscillation, and the removal device is advanced towards the tyre at each variation of the angle of oscillation.

According to one embodiment of the apparatus, the tyre is made to oscillate, starting from a minimum angle of oscillation, through angles of oscillation increasing up to a maximum angle of oscillation, and the removal device is retracted from the tyre at each variation of the angle of oscillation.

Preferably, the angle of oscillation is equal to 240° or less.

Furthermore, the maximum angle of oscillation is equal to 180° or more.

Preferably, the removal device is advanced towards the tyre at each variation of the angle of oscillation by a step equal to 0.1 mm or less.

More preferably, the removal device is advanced towards the tyre at each variation of the angle of oscillation by a step equal to 0.08 mm or less.

These values for the advancement step enable a little material to be removed at a time without risking ruining the tyre and compromising its performance on the road. In accordance with a further embodiment of the apparatus, the tyre is made to rotate continuously in a predefined direction, and the removal device is made to move between a retracted position of rest and an advanced position of engagement with the tyre, with decreasing depths of working: in the advanced position, the removal device works at a maximum depth while the tyre travels through a minimum arc of engagement with the removal device positioned around the maximum point of the first harmonic; it works at a minimum depth while the tyre travels through a maximum arc of engagement with the removal device positioned around the maximum point of the first harmonic; and it works at decreasing depths while the tyre travels through arcs of engagement with the removal device, with variations increasing from the minimum arc to the maximum arc.

According to a variant embodiment of the apparatus, the tyre is made to rotate continuously in a predefined direction, and the removal device is made to move between a retracted position of rest and an advanced position of engagement with the tyre, with increasing depths of working: in the advanced position, the removal device works at a minimum depth while the tyre travels through a maximum arc of engagement with the removal device positioned around the maximum point of the first harmonic; it works at a maximum depth while the tyre travels through a minimum arc of engagement with the removal device positioned around the maximum point of the first harmonic; and it works at increasing depths while the tyre travels through arcs of engagement with the removal device, with variations decreasing from the maximum arc to the minimum arc.

As regards the arc of maximum engagement, preferably, this maximum arc of engagement with the removal device subtends a maximum angle of engagement equal to 240° or less.

Furthermore, the maximum arc of engagement with the removal device can subtend a maximum angle of engagement equal to 180° or more.

Preferably, in the advanced position of engagement with the tyre, the removal device is advanced towards the tyre at each variation of the arc of engagement by a step equal to 0.1 mm or less.

More preferably, in the advanced position of engagement with the tyre, the removal device is advanced towards the tyre at each variation of the arc of engagement by a step equal to 0.08 mm or less.

Further characteristics and advantages will appear more clearly from the detailed description of a preferred, but not exclusive, embodiment of a process and an apparatus for grinding tyres, in accordance with the present invention.

BRIEF DESCRIPTION OF THE DRAWINGS

This description will be set forth below with reference to the attached drawings, provided solely for indicative purposes and therefore not limiting, in which.

DETAILED DESCRIPTION OF THE INVENTION

With reference to the drawings mentioned, no. 1 comprehensively indicates an apparatus according to the present invention for the grinding of tyres, configured for carrying out grinding work according to the present invention.

Figures 1, 2:
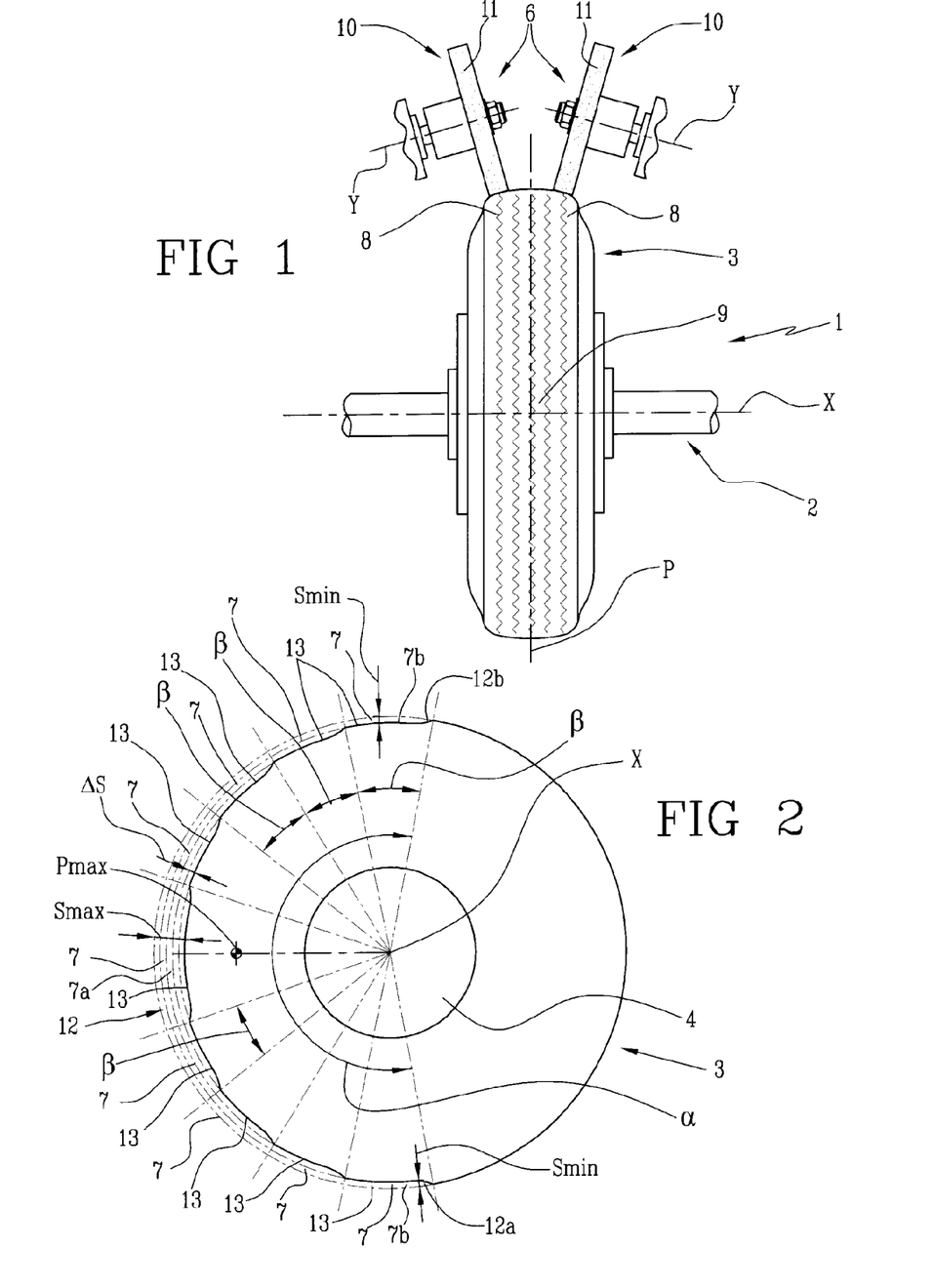
FIG. 1 shows a partial schematic view of an apparatus for grinding tyres according to the present invention.
FIG. 2 shows a lateral schematic view of a tyre at the end of the process of grinding.

Apparatus 1 includes a device 2 capable of making a tyre 3 rotate around its own axis of rotation "X" according to modalities described further on. Device 2, by way purely of non-limiting example, can include a rim 4 on which the tyre 3 is mounted. Rim 4 is supported by a shaft 5 coaxial with rim 4 itself and with the tyre 3, and operationally connected to a motor, not illustrated. A removal device 6, for example a grinder 6, is located near tyre 3 (which is mounted on rim 4) and is movable in advancing and/or a retracting direction with respect to tyre 3 with the object of removing portions 7 of the tyre 3 itself.

Grinder 6 is shaped and positioned so as to remove portions belonging to the tread 9 of tyre 3.

Preferably, grinder 6 is positioned so as to remove portions belonging to one or both shoulders 8 of the tread 9 of tyre 1.

According to what is illustrated in FIG. 1, grinder 6 includes a pair of abrasive wheels 10 rotatable around respective axes "Y" inclined to the axis of rotation "X" of tyre 3 and arranged symmetrically with respect to an equatorial plane "P" of tyre 3 itself. Each abrasive wheel 10 has a lateral working surface 11, possibly shaped, engageable with a respective shoulder 8 of tyre 3.

Apparatus 1 furthermore includes devices, not illustrated, for measuring the radial force "RF" generated by tyre 1 during its rotation, resolving this radial force "RF" into harmonics, so as to calculate at least the first harmonic "1 Hr" of this radial force "RF", and identify on tyre 1 a point "Pmax" corresponding to the maximum "Max1 Hr" of said first harmonic "1 Hr". These devices, for example, are implemented within device 2 itself and are capable of making tyre 3 rotate, or made as part of a free-standing machine.

Figure 7:
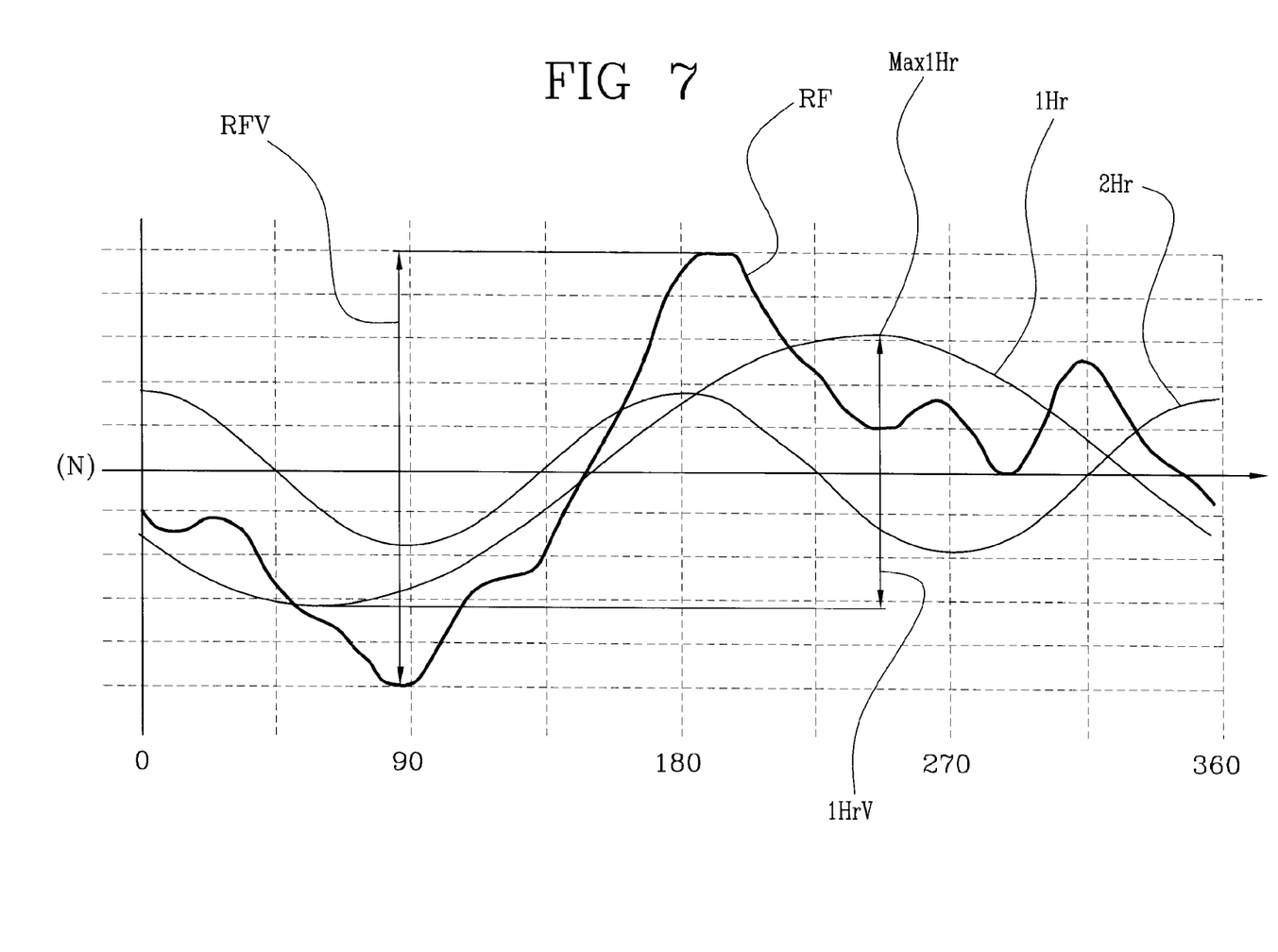
FIG. 7 illustrates the way the radial force varies and the resolution of this force into the first two harmonics.

FIG. 7, by way of example, illustrates the radial force measured "RF" and the resolution of this radial force "RF" into the first harmonic "1 Hr" and the second harmonic "2 Hr". This drawing also shows the variation in radial force "RFV" and the variation in the first harmonic "1 HrV".

After computing the above-mentioned detection and the relative resolution of the radial force "RF", the point "Pmax" (shown in the attached drawings) is identified and marked on the tyre 3, corresponding to the maximum "Max1 Hr" of the first harmonic "1 Hr".

The tyre 3 subsequently undergoes a grinding process by means of the removal of material from the shoulders 8 of tread 9 of tyre 3 over an arc 12 subtending a principal angle "α" less than 360° positioned either side of the maximum point "PMax" of the first harmonic "1 Hr". In other words, the bisector of the principal angle "α" coincides with a radius of the tyre 3 passing through the maximum point "PMax" of the first harmonic "1 Hr". Preferably, the above-mentioned principal angle "α" is between about 160° and about 240° and, even more preferably, between about 180° and about 220°.

In accordance with a preferred embodiment, principal angle "α" is a little more than 180°, so that the machining also has an effect on at least one of the maximums "Max2 Hr" of the second harmonic "2 Hr", given that, in any event, at least one of the maximums of the second harmonic "2 Hr" has a maximum phase difference with respect to the maximum "Max1 Hr" of, the first harmonic of 90° (FIG. 7).

Furthermore, the above-mentioned stage of removal is performed, by removing from each of the shoulders 8 discrete circumferential portions 7 of arc 12, with differentiated depths of removal increasing from opposite ends 12a, 12b of arc 12 towards the maximum point "PMax" of the first harmonic "1 Hr".

In other words, the depth of removal is at its greatest in the area of the maximum point "Pmax" and decreases little by little on the approach to ends 12a, 12b of arc 12.

FIG. 2 schematically illustrates tyre 3 at the end of machining. In the attached drawings the radial dimension of the discrete circumferential portions 7 removed has been deliberately enlarged by comparison with the actual machining, in order to better illustrate the invention. The removal of the discrete portions 7 generates on the shoulder 8 a "stepped" profile formed of adjacent curved surfaces 13 with their centre on the axis of rotation "X" of the tyre 3.

In reality, the profile and the dimensions of the grinder 6 do not produce the steps illustrated but, preferably, the adjacent curved surfaces 13 generated by the removal of discrete portions 7 end up connected together.

The curved surfaces 13 give rise to a profile symmetrical with respect to a radius passing through the maximum point "Pmax" identified on tyre 3.

Each of the curved surfaces 13 preferably subtends a secondary angle "β" of between about 10° and about 30° and, more preferably, between about 15° and about 20°. The secondary angles "β" can be equal to each other or different.

Preferably, the removal of a first discrete circumferential portion 7a located either side of the radius passing through the maximum point "Pmax" of the first harmonic "1 Hr" is effected for a maximum radial thickness "$S_{max}$" of between about 0.4 mm and 1.2 mm and, more preferably, between about 0.6 mm and about 0.8 mm. Preferably, furthermore, the removal of second discrete circumferential portions 7b located in proximity to the opposite ends 12a, 12b of arc 12 is effected for a minimum radial thickness "$S_{min}$" of between about 0.01 mm and 0.1 mm and, more preferably, between about 0.03 mm and about 0.08 mm.

Finally, preferably, each discrete circumferential portion 7 presents a variation in radial thickness "ΔS" with respect to the following and/or preceding discrete circumferential portion 7 of between about 0.01 mm and 0.1 mm, more preferably between about 0.03 mm and about 0.08 mm.

In any event, the magnitude of the principal angle "α", i.e. the extension of arc 12, the magnitude of secondary angles "β" and consequently their number, and the machining depths "Smin", "Smax" and "ΔS" are all parameters which can be set on the basis of the characteristics of the tyre 3 and of the radial force "RF" detected.

The machining on tyre 3 as described above can be achieved by using dedicated devices for moving the grinder 6 with respect to the tyre 3 according to different modalities. For this purpose, preferably, the movements of the grinder and of the rim 4 on which the tyre 3 is mounted are controlled by an electronic management unit, not illustrated.

In accordance with one embodiment, tyre 3 supported by shaft 5 is made to oscillate by the motor, not illustrated, around its own axis of rotation "X" (FIGS. 3a, 3b and 3c), starting from a maximum angle of oscillation "$\gamma_{max}$", through decreasing angles of oscillation "γ", down to a minimum angle of oscillation "$\gamma_{min}$". These oscillations are preferably symmetrical with respect to the position of grinder 6.

Figures 3A, 3B, 3C:
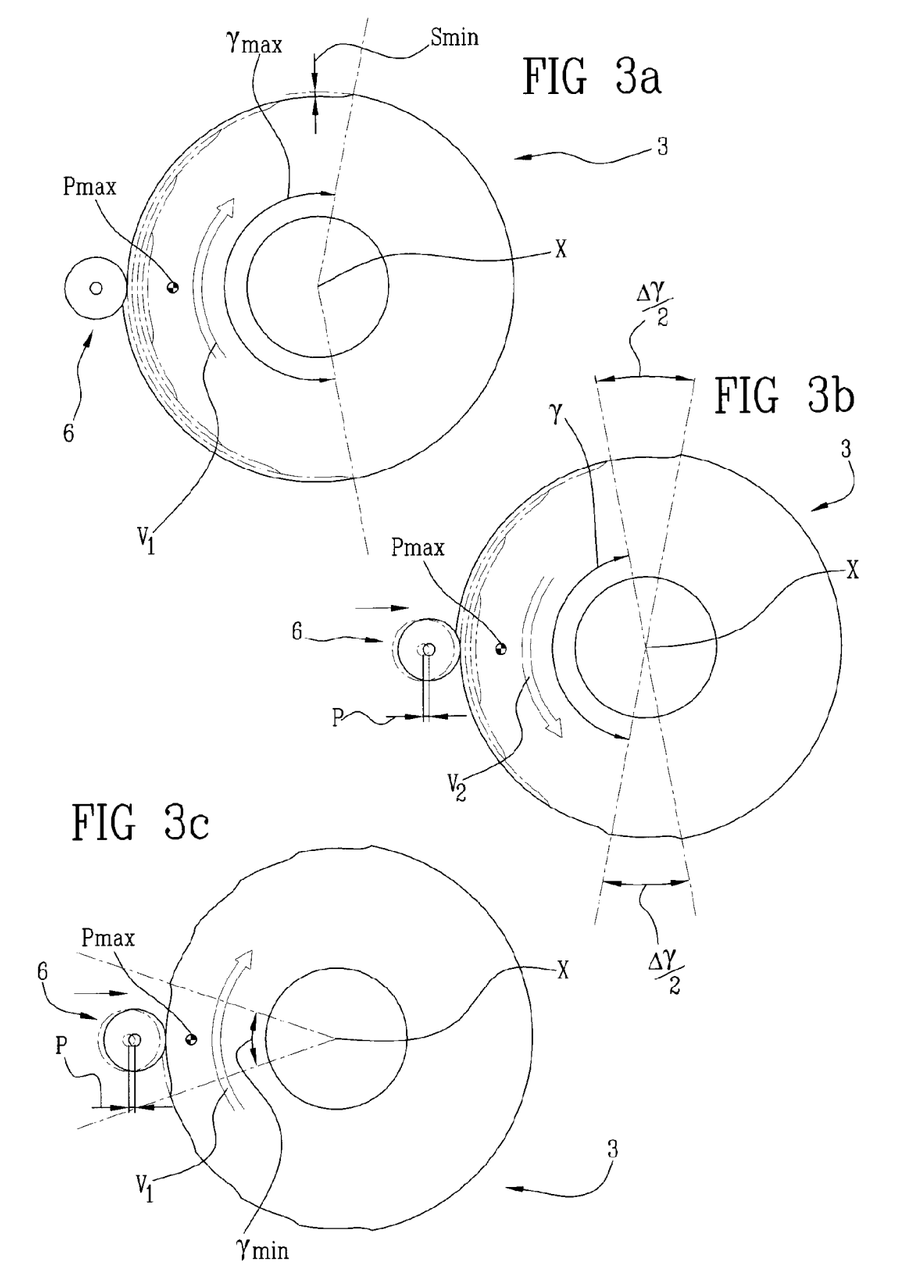
FIGS. 3a, 3b and 3c show a lateral schematic view of a tyre during successive stages of machining according to a first embodiment of the process according to the invention.

At each variation "Δγ" of angle of oscillation "γ", grinder 6 is advanced towards the tyre 3 to generate the profile formed by the adjacent curved surfaces 13.

The attached FIGS. 3a, 3b and 3c show the angles "Δγ/2" whose sum provides the variation "Δγ" in the angle of oscillation.

Preferably, the grinder 6 is advanced towards the tyre 3 at each variation "Δγ" in the angle of oscillation "γ" by a step "p" of between about 0.01 mm and about 0.1 mm, more preferably between about 0.03 mm and about 0.08 mm. In more detail, while tyre 3 oscillates describing the maximum angle of oscillation "$\gamma_{max}$" with one or more passes, grinder 6 is brought into engagement against shoulders 8, so as to remove a predefined thickness corresponding to the minimum radial thickness "$s_{min}$" mentioned above. FIG. 3a represents grinder 6 working on tyre 3 at an intermediate moment of the above-mentioned stage of removing the minimum thickness "$s_{min}$" while the tyre 3 is turning in the clockwise direction "V1". As may be noted by looking at FIG. 3a, the portion of tyre 3 located above the grinder 6 is already deprived of the minimum thickness "$s_{min}$", while the portion below the grinder 6 still remains to be machined.

After completion of the first stage of removal, grinder 6 is advanced towards tyre 3 by step "p" to remove material with greater depth, and tyre 3 is made to oscillate describing an angle "γ" smaller than the maximum angle "$\gamma_{max}$", in this case too with one or more passes, giving rise to the situation illustrated in FIG. 3b. In FIG. 3b the grinder 6 is in an intermediate stage of removal of material to the greater depth mentioned, while the tyre 3 turns in the anti-clockwise direction "V2". In particular, as may be noted by looking at FIG. 3b, the portion of tyre 3 located below the grinder 6 is already deprived of the further thickness, while the portion above the grinder 6 still remains to be machined.

This stage is repeated until the minimum angle of oscillation "$\gamma_{max}$" is reached, corresponding to the maximum radial machining thickness "$s_{max}$" mentioned above (FIG. 3c). In FIG. 3c the grinder 6 is in an intermediate stage of removal of material to the maximum depth, while tyre 3 turns in the clockwise direction "V1".

In accordance with a variant of the embodiment described above (FIGS. 4a, 4b and 4c), tyre 3 supported by shaft 5 is made to oscillate starting from a minimum angle of oscillation "$\gamma_{min}$", through increasing angles of oscillation "γ", up to a maximum angle of oscillation "$\gamma_{max}$". These oscillations are preferably symmetrical with respect to the position of grinder 6.

Figures 4A, 4B, 4C:
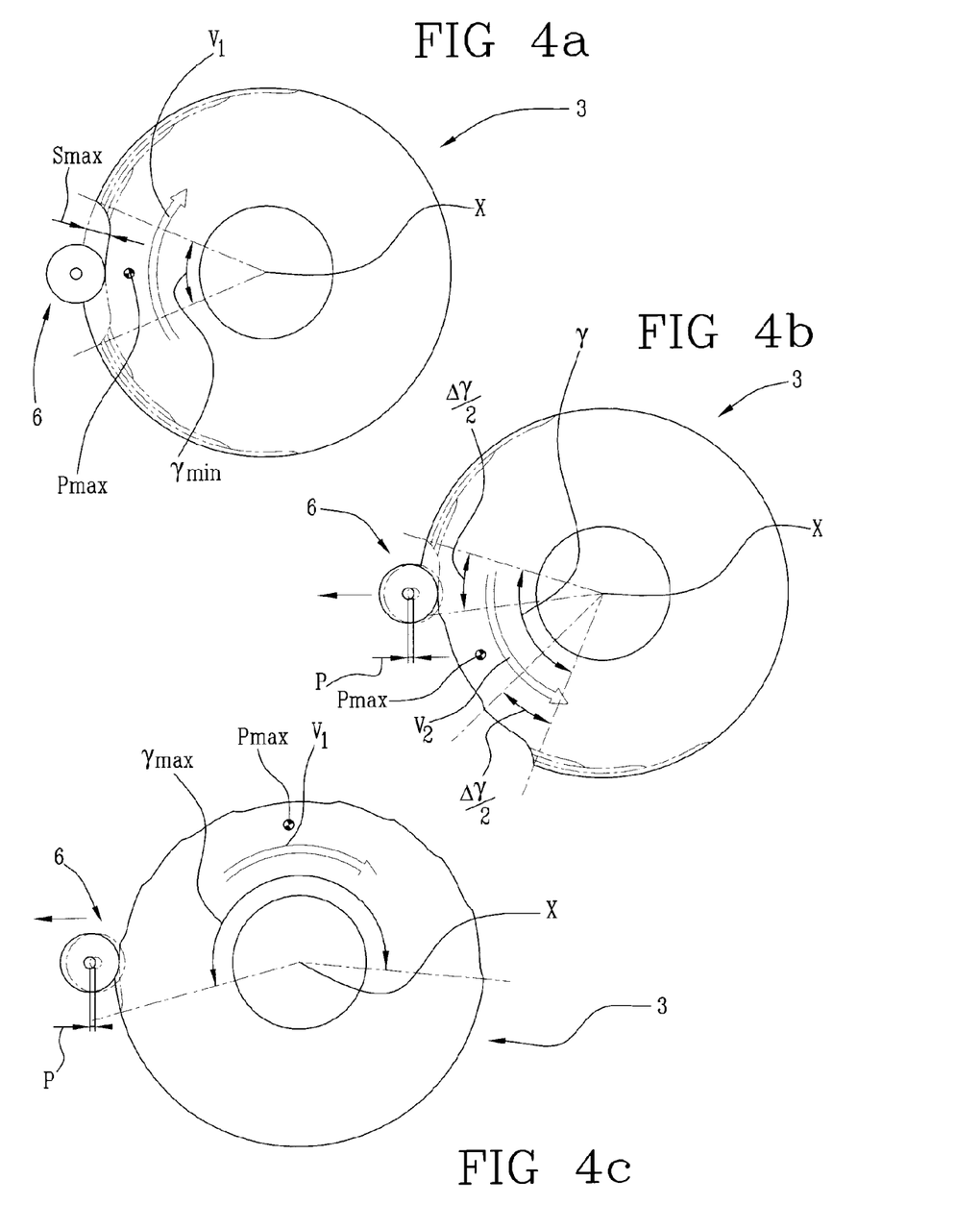
FIGS. 4a, 4b and 4c show a lateral schematic view of a tyre during successive stages of machining according to a variant of the first embodiment of the process according to the invention.

At each variation "Δγ" of angle of oscillation "γ", grinder 6 is retracted, in other words it is withdrawn from tyre 3, by a step "p".

The attached FIGS. 4a, 4b and 4c show the angles "Δγ/2" whose sum provides the variation "Δγ" in the angle of oscillation.

Preferably, grinder 6 is retracted from tyre 3 at each variation "Δγ" in the angle of oscillation "γ" by a step "p" of between about 0.01 mm and about 0.1 mm, more preferably between about 0.03 mm and about 0.08 mm.

In more detail, while tyre 3 oscillates describing the minimum angle of oscillation "$\gamma_{min}$" with one or more passes, grinder 6 is brought into engagement against shoulders 8, so as to remove a predefined thickness corresponding to the maximum radial thickness "$s_{max}$" mentioned above, as illustrated in FIG. 4a. FIG. 4a represents grinder 6 working on tyre 3 at an intermediate moment of the above-mentioned stage of removing the maximum thickness "$s_{max}$" while the tyre 3 is turning in the clockwise direction "V1".

After completion of the first stage of removal, grinder 6 is retracted 3 by step "p" to remove material with a lesser depth, and tyre 3 is made to oscillate describing an angle "γ" greater than the minimum angle "$\gamma_{min}$", in this case too with one or more passes, giving rise to the situation illustrated in FIG. 4b. In FIG. 4b the grinder 6 is in a final stage of removal of material to the lesser depth mentioned, while the tyre 3 turns in the anti-clockwise direction "V2".

This stage is repeated until the maximum angle of oscillation "$\gamma_{max}$" is reached, corresponding to the minimum radial machining thickness "$s_{min}$" mentioned above (FIG. 4c). In FIG. 4c the grinder 6 is in a final stage of removal of material to the minimum depth, while tyre 3 turns in the clockwise direction "V1".

With reference both to the embodiment and to its variant described above, the maximum angle of oscillation "$\gamma_{max}$" is preferably between about 160° and about 240°, more preferably between about 180° and about 220°.

The minimum angle of oscillation "$\gamma_{min}$" is preferably between about 20° and about 60°, more preferably between about 30° and about 40°.

The variation "$\Delta\gamma$" in the angle of oscillation "$\gamma$" is preferably between about 20° and about 60°, more preferably between about 30° and about 40°.

In accordance with a further embodiment (FIGS. 5a, 5b, 5c and 5d), tyre 3 is made to rotate continuously around its own axis of rotation "X" in a predefined direction "V", while grinder 6 is made to move between a retracted position of rest (FIG. 5b) and an advanced position of engagement with tyre 3 (FIGS. 5a, 5c and 5d) with decreasing depths of working.

Figure 5A:
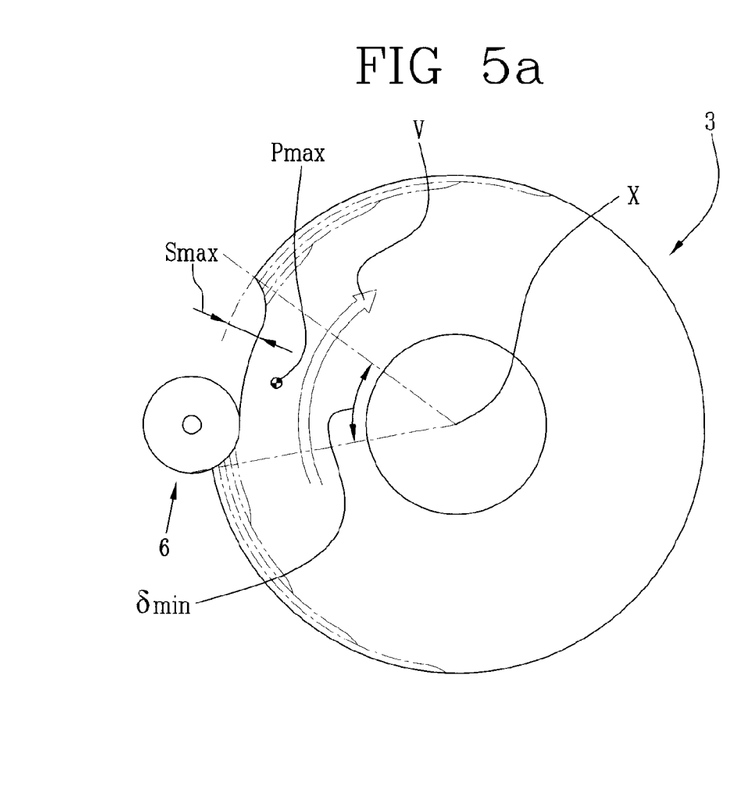
FIGS. 5a, 5b, 5c and 5d show a lateral schematic view of a tyre during successive stages of machining according to a second embodiment of the process according to the invention.
Figure 5B:
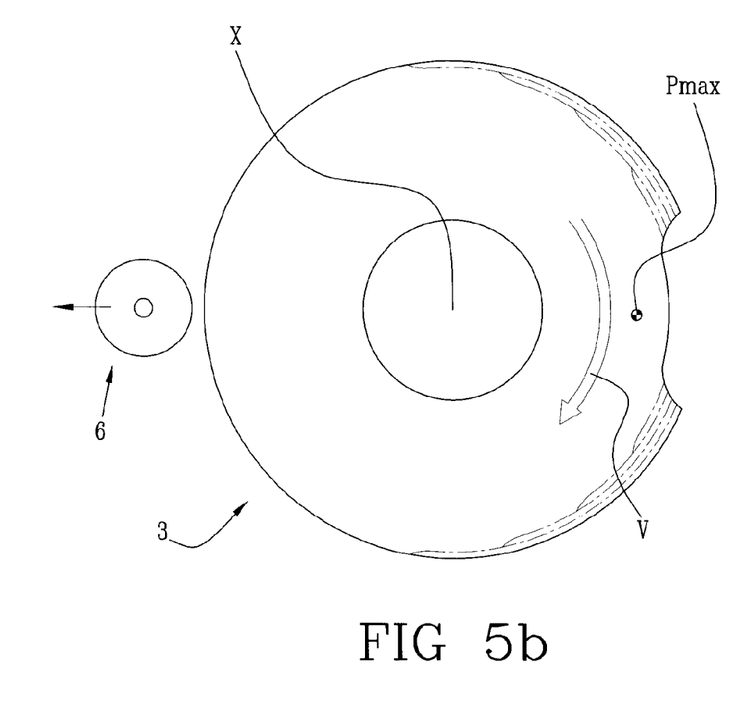
Figure 5C:
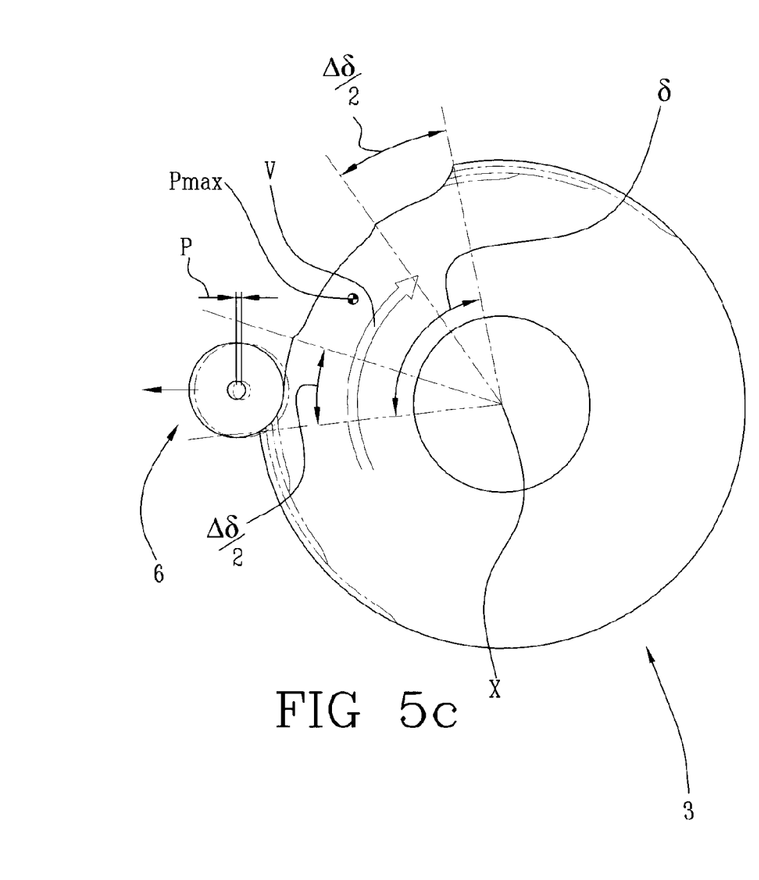

In the advanced position, grinder 6 works at a maximum depth while tyre 3 travels through a minimum arc of engagement with grinder 6 subtending a minimum angle "$\delta_{min}$", while positioned either side of maximum point "Pmax" of the first harmonic "1 Hr" (FIG. 5a). Grinder 6 works at a minimum depth while tyre 3 travels through a maximum arc of engagement with grinder 6 subtending a maximum angle "$\delta_{max}$" while positioned either side of maximum point "Pmax" of the first harmonic "1 Hr" (FIG. 5c). The grinder 6 works at decreasing depths while tyre 3 travels through arcs of engagement with grinder 6 with variations increasing from the minimum arc to the maximum arc.

Figure 5D:
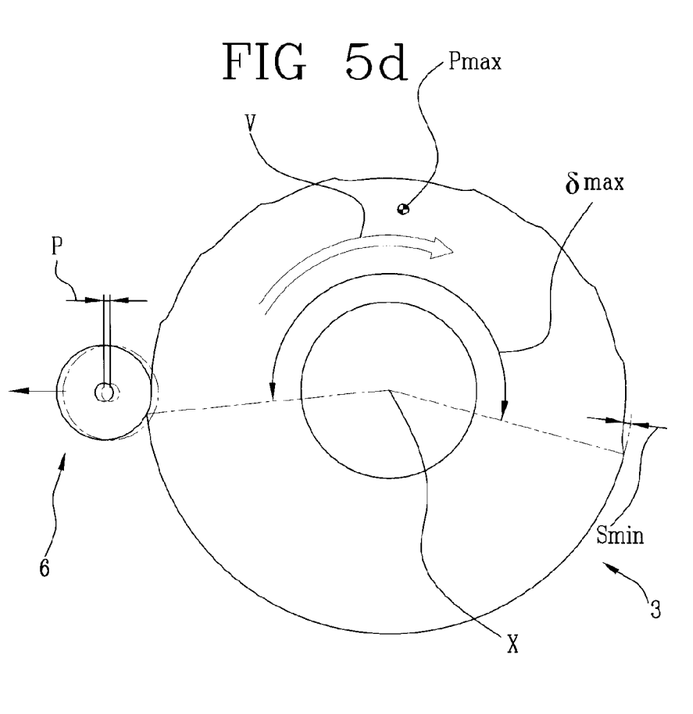

Preferably, when the advanced position of engagement with tyre 3 is reached, grinder 6 is retracted from tyre 3 at each variation in the arc of engagement by a step "p" of between about 0.01 mm and about 0.1 mm, more preferably between about 0.03 mm and about 0.08 mm. With reference to FIGS. 5a-5d, while tyre 3 rotates in the clockwise direction "V", the grinder 6 is brought into engagement against the shoulders 8 along the minimum arc subtending the minimum angle "$\delta_{min}$", so as to remove a predefined thickness corresponding to the maximum radial thickness "$s_{max}$" mentioned above, as illustrated in FIG. 5a, and is retracted from tyre 3 while tyre 3 itself completes its own 360° revolution, so as not to machine the remaining portion of shoulders 8, as illustrated in FIG. 5b. In particular, in FIG. 5a the grinder 6 is in a final stage of removing the portion with the maximum radial thickness "$s_{max}$".

After completion of the first stage of removal, while tyre 3 continues to rotate in the same direction "V", grinder 6 is brought into engagement against shoulders 8 along an arc subtending an angle of engagement "$\delta$", greater than the minimum arc and with a depth of working less than the preceding, giving rise to the configuration illustrated in FIG. 5c. In FIG. 5c, the grinder 6 is at the end of a second stage of removal. This drawing also shows the displacement of grinder 6 by step "p" with respect to the position taken by grinder 6 during the machining shown in FIG. 5a. These passes are repeated until the maximum arc is machined for the minimum machining thickness "$s_{min}$" mentioned above (FIG. 5d). In FIG. 5d, grinder 6 is at the end of the stage of removing the portion with the minimum radial thickness "$s_{min}$". This drawing also shows the displacement of grinder 6 by step "p" with respect to the position taken by grinder 6 during the previous machining.

Figure 6A:
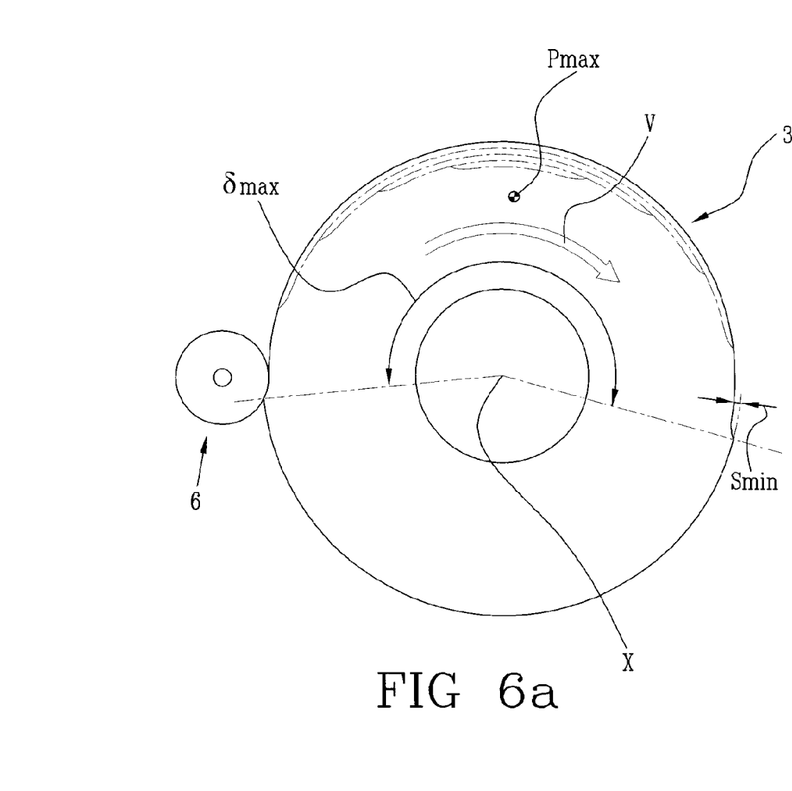
FIGS. 6a, 6b, 6c and 6d show a lateral schematic view of a tyre during successive stages of machining according to a variant of the second embodiment of the process according to the invention.

In accordance with a variant of the further embodiment described above (FIGS. 6a, 6b, 6c and 6d), while tyre 3 is made to rotate continuously in predefined direction "V", grinder 6 is made to move/oscillate between a retracted position of rest (FIG. 6b) and an advanced position of engagement with tyre 3 (FIGS. 6a, 6c and 6d) with increasing depths of working.

In the advanced position, grinder 6 works at a minimum depth while the tyre 3 travels through a maximum arc of engagement with grinder 6 positioned either side of the maximum point "PMax" of the first harmonic "1 Hr" (FIG. 6a); grinder 6 works at a maximum depth while the tyre 3 travels through a minimum arc of engagement with the grinder 6 positioned around the maximum point of the first harmonic "1 Hr" (FIG. 6d); and it works at increasing depths while tyre 3 travels through arcs of engagement with grinder 6 with variations decreasing from the maximum to the minimum arc.

Preferably, when the advanced position of engagement with tyre 3 is reached, grinder 6 is advanced towards tyre 3 at each variation in the arc of engagement by a step "p" of between about 0.01 mm and about 0.1 mm, more preferably between about 0.03 mm and about 0.08 mm.

Figure 6B:
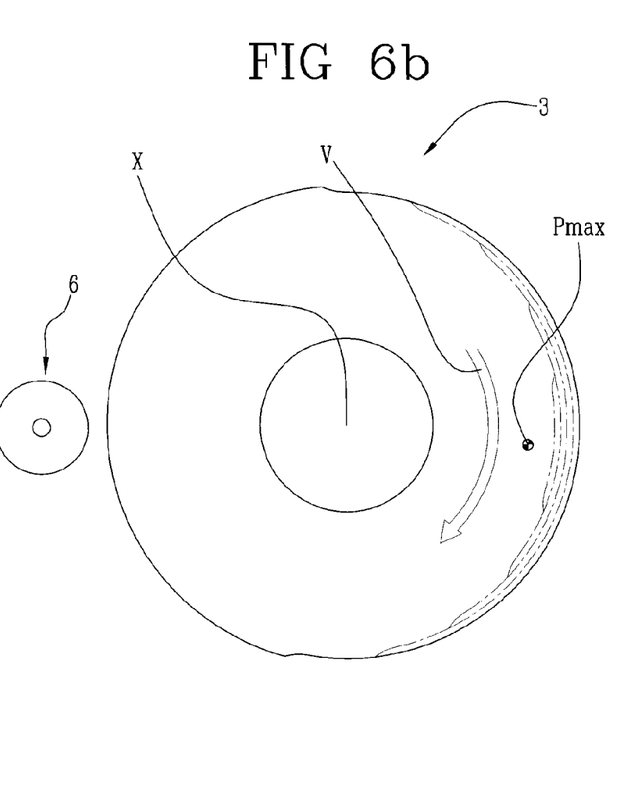

In more detail, while tyre 3 rotates, grinder 6 is brought into engagement against shoulders 8 along the maximum arc, subtending a maximum angle of engagement "$\delta_{max}$", so as to remove a predefined thickness corresponding to the minimum radial thickness "$s_{min}$" mentioned above, as illustrated in FIG. 6a, and is retracted from tyre 3 while tyre 3 itself completes its own 360° revolution, so as not to machine the remaining portion of shoulders 8, as illustrated in FIG. 6b. After completion of this first stage of removal, while tyre 3 continues to rotate, grinder 6 is brought into engagement against shoulders 8 along an arc smaller than the maximum arc and with a depth of working greater than the preceding, giving rise to the configuration illustrated in FIG. 6c.

Figure 6C:
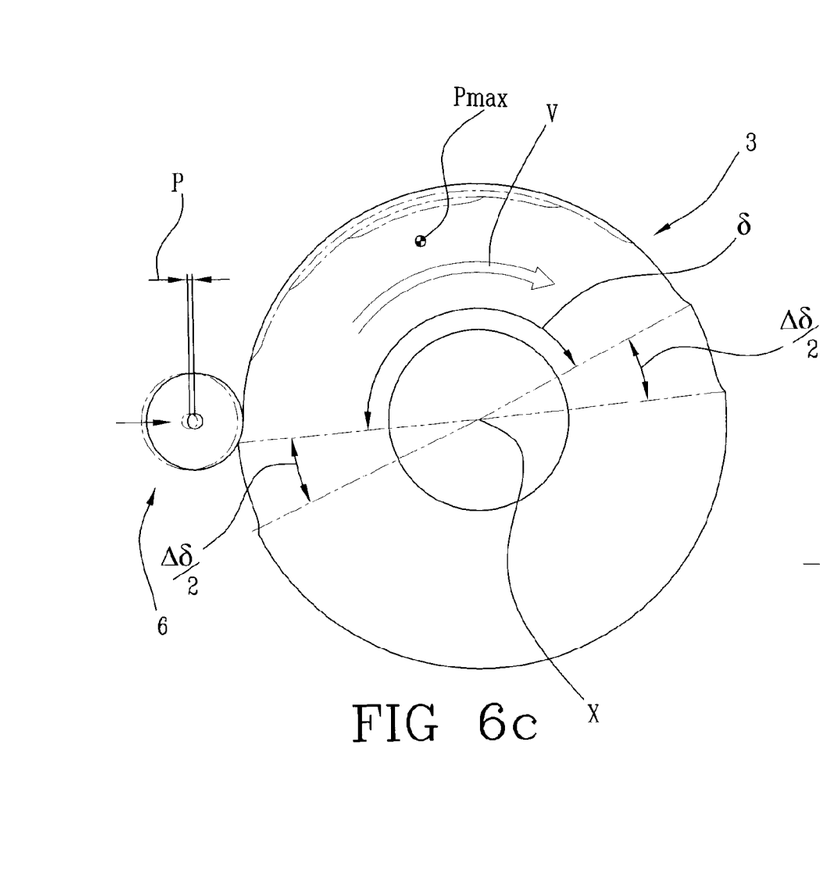
Figure 6D:
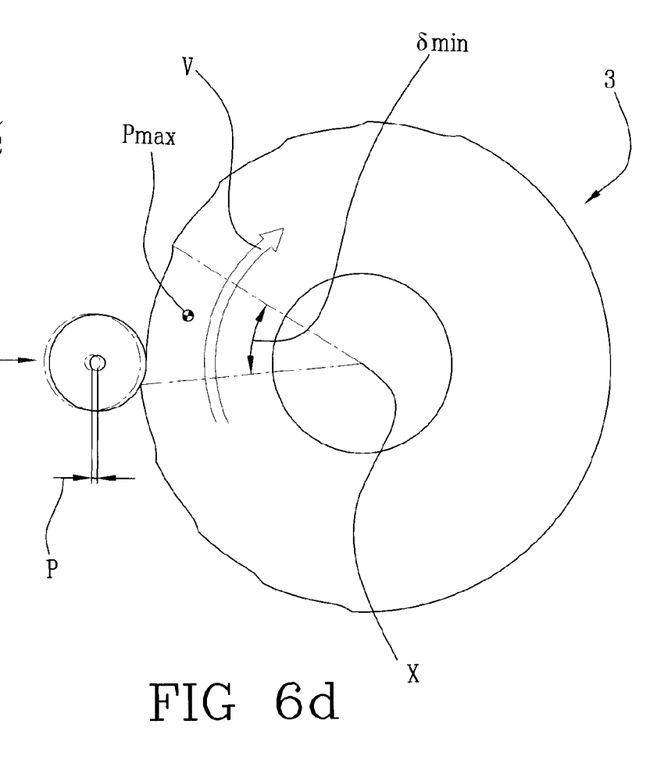

This stage is repeated until the minimum arc is machined, subtending a minimum angle of engagement "$\delta_{min}$", for the maximum radial machining thickness "$s_{max}$" mentioned above (FIG. 6d). FIGS. 6c and 6d also show the displacement of grinder 6 by step "p" with respect to the position taken by grinder 6 during the previous machining.

With reference both to the further embodiment and to its variant described above, the maximum angle of engagement "$\delta_{max}$" is preferably between about 160° and about 240°, more preferably between about 180° and about 220°. Furthermore, the minimum angle of oscillation "$\delta_{min}$" is preferably between about 20° and about 60°, and more preferably between about 30° and about 40°.

Preferably, furthermore, the variation in the arc of engagement with grinder 6 subtends a variation "$\Delta\delta$" in angle of engagement "$\delta$" of between about 20° and about 60°, more preferably between about 30° and about 40°. The attached FIGS. 5a-5d and 6a-6d show the angles "$\Delta\delta/2$" whose sum provides the variation "$\Delta\delta$" in the angle of engagement with grinder 6.

By way of example, the three tables below show values relating to three grinding processes, two for comparison and one according to the invention.

Tables A1 and A2 show values relating to grinding processes carried out by removing a constant and uniform thickness of material from the shoulders of the tyre over an arc of 180°.

Table B on the other hand shows values relating to the grinding process in accordance with the invention.

In each table, each of the rows represents one tyre. The second column from the left indicates the values for variation "RFV" before the grinding process, i.e. after vulcanisation. The third column indicates the values for "RFV" after machining. The fourth column indicates the variation in "RFV" between before and after the grinding process. The fifth column from the left indicates the values for "1 HrV" before the grinding process, i.e. after vulcanisation. The sixth column indicates the values for "1 HrV" after the grinding process. The seventh column indicates the variation in "1 HrV" between before and after the grinding process.

Because a tyre may be used as original equipment, it is necessary for the value of "RFV" and the value of "1 HrV" not to exceed predefined thresholds. In the examples shown, these thresholds have been fixed at values respectively of 115 N and 70 N.

TABLE A1

(COMPARISON)

| | RFV before | RFV after | ΔRFV | 1HrV before | 1HrV after | Δ1HrV |
|---|---|---|---|---|---|---|
| 1 | 128 | 108 | 20 | 45 | 33 | 12 |
| 2 | 138 | 113 | 25 | 59 | 28 | 31 |
| 3 | 125 | 133 | −8 | 59 | 36 | 23 |
| 4 | 146 | 132 | 14 | 74 | 36 | 38 |
| 5 | 153 | 125 | 28 | 125 | 87 | 39 |
| 6 | 120 | 115 | 5 | 111 | 73 | 38 |
| 7 | 140 | 115 | 25 | 123 | 86 | 38 |
| 8 | 125 | 107 | 18 | 111 | 56 | 55 |
| 9 | 137 | 140 | −3 | 114 | 109 | 5 |
| 10 | 113 | 96 | 17 | 94 | 58 | 36 |
| | 132.5 | 118.4 | 14.1 | 91.6 | 60.1 | 31.5 |

TABLE A2

(COMPARISON)

| | RFV before | RFV after | ΔRFV | 1HrV before | 1HrV after | Δ1HrV |
|---|---|---|---|---|---|---|
| 1 | 114 | 87 | 27 | 77 | 74 | 3 |
| 2 | 85 | 61 | 24 | 67 | 26 | 41 |
| 3 | 116 | 108 | 8 | 55 | 32 | 23 |
| 4 | 116 | 112 | 4 | 77 | 60 | 17 |
| 5 | 110 | 124 | −14 | 89 | 115 | −26 |
| 6 | 96 | 87 | 9 | 80 | 70 | 10 |
| 7 | 97 | 79 | 18 | 81 | 63 | 18 |
| 8 | 125 | 145 | −20 | 80 | 109 | −29 |
| 9 | 144 | 101 | 43 | 106 | 77 | 29 |
| | 111.4 | 100.4 | 11.0 | 79.1 | 69.6 | 9.6 |

As may be noted from Table A1, before machining is carried out, removing a constant thickness over an angle of 180°, eight tyres (1, 2, 3, 4, 5, 7, 8, 9) have an "RFV" outside limits and seven (4, 5, 6, 7, 8, 9, 10) have a "1 HrV" outside limits. After machining, four tyres (3, 4, 5, 9) still have an "RFV" outside limits and three tyres (5, 6 and 9) still have a "1 HrV" outside limits.

As may be noted from Table A2, before machining is carried out, removing a constant thickness over an angle of 180°, four tyres (3, 4, 8, 9) have an "RFV" outside limits and seven (1, 4, 5, 6, 7, 8, 9) have a "1 HrV" outside limits. After machining, two tyres (8 and 9) still have an "RFV" outside limits and three tyres (5, 8 and 9) still have a "1 HrV" outside limits.

TABLE B (INVENTION)

| | RFV before | RFV after | ΔRFV | 1HrV before | 1HrV after | Δ1HrV |
|---|---|---|---|---|---|---|
| 1 | 125 | 107 | 18 | 97 | 3 | 94 |
| 2 | 124 | 91 | 33 | 105 | 64 | 41 |
| 3 | 126 | 78 | 48 | 86 | 20 | 66 |
| 4 | 121 | 95 | 26 | 94 | 63 | 31 |
| 5 | 111 | 97 | 14 | 75 | 62 | 13 |
| 6 | 96 | 55 | 41 | 67 | 33 | 34 |
| 7 | 104 | 71 | 33 | 75 | 25 | 50 |
| 8 | 110 | 108 | 2 | 79 | 50 | 29 |
| 9 | 113 | 100 | 13 | 59 | 35 | 24 |
| 10 | 102 | 63 | 39 | 74 | 46 | 28 |
| 11 | 100 | 98 | 2 | 71 | 55 | 16 |
| 12 | 111 | 94 | 17 | 87 | 65 | 22 |
| 13 | 121 | 91 | 30 | 89 | 61 | 28 |
| 14 | 132 | 73 | 59 | 102 | 39 | 63 |
| 15 | 97 | 43 | 54 | 81 | 16 | 65 |
| 16 | 126 | 114 | 12 | 84 | 47 | 37 |
| 17 | 119 | 91 | 28 | 82 | 45 | 37 |
| 18 | 123 | 87 | 56 | 88 | 46 | 42 |
| | 114.5 | 85.3 | 29.2 | 83.1 | 43.1 | 40.0 |

As may be noted from Table B, before grinding process is carried out according to the invention, removing material over an angle of 180°, nine tyres (1, 2, 3, 4, 13, 14, 16, 17, 18) have an "RFV" outside limits and sixteen (1-5, 7, 8, 10-18) have a "1 HrV" outside limits. After grinding process being carried out in accordance with the present invention, all the tyres have an "RFV" and a "1 HrV" within limits.

In Table A1, the average lowering of "RFV" after machining is carried out (removing a constant thickness over an angle of 180° is 14.1 N, and the average lowering of "1 HrV" is 31.5 N.

In Table A2, the average lowering of "RFV" after machining is carried out (removing a constant thickness over an angle of 180° is 11.0 N, and the average lowering of "1 HrV" is 9.6 N.

As may be noted from Table B, the average lowering of "RFV" and "1 HrV" after machining according to the invention is 29.2 N and 40.0 N respectively.

The invention claimed is:
1. A process for grinding a tyre, comprising the steps of:
 detecting a curve of a radial force of a tyre;
 calculating a first harmonic of said radial force;
 identifying on the tyre a point corresponding to a maximum of said first harmonic; and
 removing material from the tread of the tyre over an arc subtending a principal angle positioned either side of the maximum point of the first harmonic,
 wherein the removal step is performed by removing from the tread discrete circumferential portions of the arc with differentiated depths of removal, increasing from opposite ends of said arc toward the maximum point of the first harmonic.
2. The process according to claim 1, wherein the principal angle is 240° or less.
3. The process according to claim 1, wherein the principal angle is 180° or more.
4. The process according to claim 1, wherein material is removed from at least one shoulder of the tread.
5. The process according to claim 1, wherein material is removed from each shoulder of the tread.
6. The process according to claim 1, wherein removal of discrete circumferential portions generates corresponding surfaces centred on an axis of rotation of the tyre.

7. The process according to claim 1, wherein removal of discrete circumferential portions generates curved surfaces having a profile symmetrical with respect to a radius passing through the maximum point.

8. The process according to claim 1, wherein, in an area of a first discrete circumferential portion located either side of the maximum point, material with a maximum radial thickness of 1.2 mm or less is removed.

9. The process according to claim 1, wherein, in an area of a first discrete circumferential portion located either side of the maximum point, material with a maximum radial thickness of 0.4 mm or more is removed.

10. An apparatus for grinding a tyre, comprising:
devices capable of measuring radial force of a tyre, calculating a first harmonic of said radial force and identifying on the tyre a point corresponding to a maximum of a first harmonic;
a device capable of making the tyre rotate around an axis of rotation of the tyre;
a removal device having working surfaces capable of engaging with a tread of said tyre;
devices capable of moving the removal device with respect to the tyre; and
a device capable of controlling the movement of said removal device, so as to remove material from the tread of the tyre over an arc subtending a principal angle positioned either side of the maximum point of the first harmonic, by removing from the tread discrete circumferential portions of the arc with differentiated depths of removal increasing from opposite ends of said arc toward the maximum point of the first harmonic.

11. The apparatus according to claim 10, wherein the tyre is made to oscillate, starting from a maximum angle of oscillation through angles of oscillation decreasing down to a minimum angle of oscillation, and the removal device is advanced toward the tyre at each variation of the angle of oscillation.

12. The apparatus according to claim 11, wherein a maximum angle of oscillation is 240° or less.

13. The apparatus according to claim 11, wherein a maximum angle of oscillation is 180° or more.

14. The apparatus according to claim 11, wherein the removal device is advanced toward the tyre at each variation of the angle of oscillation by a step equal to 0.1 mm or less.

15. The apparatus according to claim 11, wherein the removal device is advanced toward the tyre at each variation of the angle of oscillation by a step equal to 0.08 mm or less.

16. The apparatus according to claim 10, wherein the tyre is made to oscillate, starting from a minimum angle of oscillation, through angles of oscillation increasing up to a maximum angle of oscillation, and the removal device is retracted from the tyre at each variation of the angle of oscillation.

17. The apparatus according to claim 10, wherein the tyre is made to rotate continuously in a predefined direction, and the removal device is made to move between a retracted position of rest and an advanced position of engagement with the tyre with decreasing depths of working; in the advanced position, with the removal device working at a maximum depth while the tyre travels through a minimum arc of engagement with the removal device positioned either side of the maximum point of the first harmonic; working at a minimum depth while the tyre travels through a maximum arc of engagement with the removal device positioned either side of the maximum point of the first harmonic; and working at decreasing depths while the tyre travels through arcs of engagement with the removal device, with variations increasing from the minimum arc to the maximum arc.

18. The apparatus according to claim 10, wherein the tyre is made to rotate continuously in a predefined direction, and the removal device is made to move between a retracted position of rest and an advanced position of engagement with the tyre with increasing depths of working; in the advanced position, with the removal device working at a minimum depth while the tyre travels through a maximum arc of engagement with the removal device positioned either side of the maximum point of the first harmonic; working at a maximum depth while the tyre travels through a minimum arc of engagement with the removal device positioned either side of the maximum point of the first harmonic; and working at increasing depths while the tyre travels through arcs of engagement with the removal device, with variations decreasing from the maximum arc to the minimum arc.

19. The apparatus according to claim 17, wherein the maximum arc of engagement with the removal device subtends a maximum angle of engagement of 240° or less.

20. The apparatus according to claim 17, wherein the maximum arc of engagement with the removal device subtends a maximum angle of engagement of 180° or more.

21. The apparatus according to claim 18, wherein, in the advanced position of engagement with the tyre, the removal device is advanced toward the tyre at each variation of the arc of engagement by a step equal to 0.1 mm or less.

22. The apparatus according to claim 18, wherein, in the advanced position of engagement with the tyre, the removal device is advanced toward the tyre at each variation of the arc of engagement by a step equal to 0.08 mm or less.

* * * * *